United States Patent [19]

Lauer

[11] Patent Number: 5,605,593
[45] Date of Patent: Feb. 25, 1997

[54] MULTI-LAYERED BONDED CLOSURE SYSTEM FOR FOAM TUBES OR PROFILES

[75] Inventor: Eduardo Lauer, Zebulon, N.C.

[73] Assignee: NMC of North America, Zebulon, N.C.

[21] Appl. No.: 395,758

[22] Filed: Feb. 28, 1995

Related U.S. Application Data

[62] Division of Ser. No. 47,487, Apr. 19, 1993, Pat. No. 5,421,371.

[51] Int. Cl.$^6$ ................................................. B32B 31/00
[52] U.S. Cl. ........................ 156/230; 156/247; 156/249; 156/322; 156/203
[58] Field of Search ........................ 156/66, 203, 235, 156/466, 247, 249, 289, 230, 248, 268, 322; 138/DIG. 1, 151; 428/36, 40, 57, 194

[56] References Cited

U.S. PATENT DOCUMENTS

| | | | |
|---|---|---|---|
| 3,195,184 | 7/1965 | Svec | 156/66 X |
| 3,257,228 | 6/1966 | Reed | 428/40 X |
| 3,388,017 | 6/1968 | Grimsley et al. | 156/203 X |
| 3,575,769 | 4/1971 | Radzio | 156/466 |
| 3,777,632 | 12/1973 | Pepmeier | 156/203 X |
| 3,829,340 | 8/1974 | Dembiak et al. | 156/203 X |
| 3,950,213 | 4/1976 | Rejeski et al. | 156/203 X |
| 4,022,248 | 5/1977 | Hepner et al. | 138/149 X |
| 4,035,211 | 7/1977 | Bill et al. | 156/56 X |
| 4,243,453 | 1/1981 | McClintock | 156/235 X |
| 4,413,656 | 11/1983 | Pithouse | 138/110 X |
| 4,419,158 | 12/1983 | Osterhagen et al. | 156/66 |
| 4,446,181 | 5/1984 | Wood | 156/203 X |
| 4,478,670 | 10/1984 | Heyse et al. | 156/443 X |
| 4,584,217 | 4/1986 | McClintock | 428/40 |
| 4,606,957 | 8/1986 | Cohen | 428/40 X |
| 4,690,668 | 9/1987 | Rebmann et al. | 156/203 X |
| 4,778,700 | 10/1988 | Pereira | 428/40 X |
| 4,778,703 | 10/1988 | Fontanilla | 138/149 X |
| 4,780,347 | 10/1988 | Cohen | 428/36 X |
| 4,842,908 | 6/1989 | Cohen et al. | 428/34.2 X |
| 4,937,111 | 6/1990 | Fontanilla | 428/34.1 |
| 4,946,732 | 8/1990 | Cohen et al. | 428/192 X |
| 5,069,969 | 12/1991 | McClintock et al. | 428/36.5 X |
| 5,104,701 | 4/1992 | Cohen | 428/34.5 X |
| 5,123,453 | 6/1992 | Robbins | 138/151 |
| 5,141,793 | 8/1992 | Fontanilla | 428/42 X |
| 5,411,777 | 5/1995 | Steele et al. | 428/215 X |

FOREIGN PATENT DOCUMENTS

| | | | |
|---|---|---|---|
| 1162543 | 2/1964 | Germany | 156/66 |
| 2509833 | 3/1975 | Germany | 156/66 |
| 1478891 | 7/1977 | United Kingdom | 156/66 |
| 1514369 | 6/1978 | United Kingdom | 156/66 |

*Primary Examiner*—David A. Simmons
*Assistant Examiner*—Paul M. Rivard
*Attorney, Agent, or Firm*—Melvin I. Stoltz

[57] ABSTRACT

By providing a multi-layered, self-sealing, adhesive system constructed for being laminated directly to a thermoplastic or elastomeric elongated tube, a highly effective, easily employed, closure system for securely sealing the elongated slit of elongated, thermoplastic or elastomeric tubes is obtained. In the preferred embodiment, the multi-layered, self-adhering, sealing system of this invention is manufactured in a substantially continuous elongated strip and incorporates a laminating film layer and a film support layer. In this way, secure, integral bonded affixation of the sealing system to the elongated tube is attained in a unique cost-effective, highly efficient manufacturing process. In addition, by integrally affixing the laminating film layer and the film support layer along both sides of the elongated slit of the tube, an adhesive engaging surface is provided for assuring secure, leak-free sealed closure of the elongated tube.

4 Claims, 2 Drawing Sheets

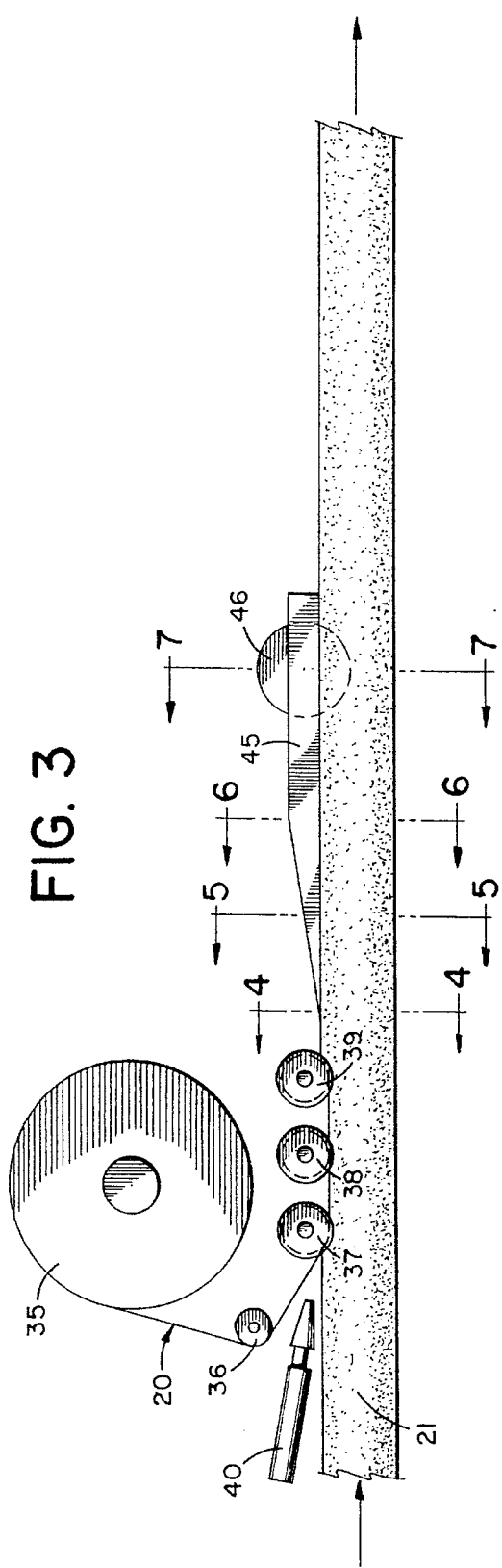
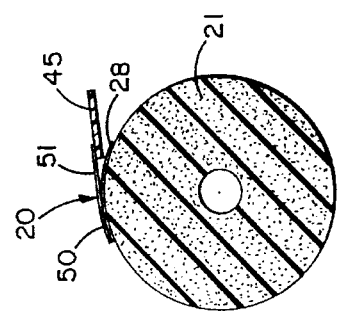
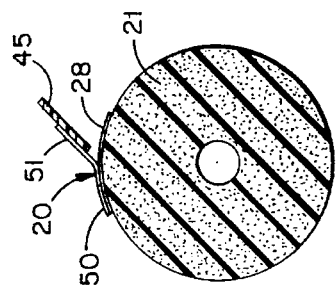
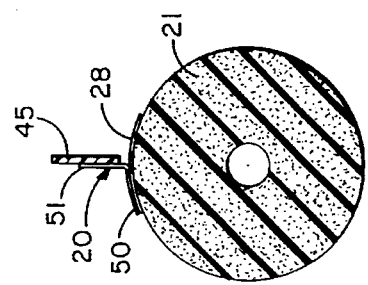
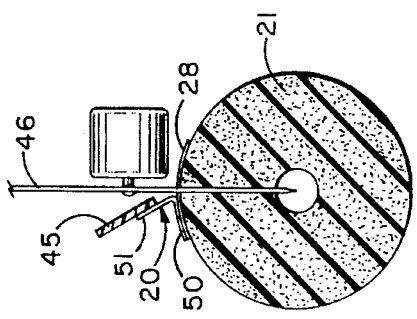

MULTI-LAYERED BONDED CLOSURE SYSTEM FOR FOAM TUBES OR PROFILES

This application is a division of application Ser. No. 08/047,487, filed Apr. 19, 1993 now U.S. Pat. No. 5,421,371.

TECHNICAL FIELD

This invention relates to closure systems for elongated, thermoplastic or elastomeric tubes formed for peripherally surrounding elongated pipes and, more particularly, to such elongated insulating tubes wherein the closure system is intimately bonded to the tube and is easily sealable for securely mounting the tube about a pipe.

BACKGROUND ART

With the ever increasing importance being placed upon energy conservation, an increasing number of domestic and commercial heating and cooling systems are being insulated, in order to reduce or eliminate temperature losses occurring along the pipes which carry heating or cooling fluid. In particular, in conventional hot water delivery and heating installations, hot water is carried through elongated pipes, which are mounted in basements or unheated plenums.

It has been found that a substantial amount of heat loss is experienced through the walls of the pipes due to radiation through the walls of the pipe into the lower temperature basement or plenum. In order to virtually eliminate or substantially reduce this considerable energy loss, insulation has been wrapped around the pipe. In addition, the insulation of pipes also virtually eliminates condensation on the outer surfaces of the pipes, as well as pipe corrosion, particularly from water in underground installations.

The most popular insulation systems comprise wrapping fiberglass around the elongated pipes, or installing elongated, pre-cut cylindrically shaped tubes of elastomeric or thermoplastic material. Due to the ease of installation and handling, the pre-slit thermoplastic or elastomeric insulating tubes have become extremely popular.

In order to install these insulating tubes, the tube is merely opened along the longitudinally extending slit formed therein and extending the entire length of the tube. In this way, the insulating tube is quickly and easily positioned about the fluid carrying conduit, providing the desired insulation thereto. In addition, pipe bends or other junctions are easily handled by merely cutting the tubes to the appropriate shape in order to meet with the adjacent insulation material.

In order to properly install the pre-slit, elongated insulating tubes, the longitudinally extending tube must be sealed to prevent unwanted heat loss or water seepage through the slit. It is this requirement for sealing the tube which has caused the greatest problems.

Most prior art systems typically incorporate external means, such as tape, glue, clips, or cement to provide the desired adhesion between the slit surfaces. However, these systems are extremely unpopular, due to the cumbersome nature of installing the external adhesive or fastening means, as well as the difficulty in assuring that the entire slit has been sealed and that no open zones have been left. Complete sealing is extremely important, since open zones allow temperature losses, or water seepage to occur, thereby reducing the effectiveness of the insulation.

One of the principal difficulties encountered with prior art tape, cement and glue sealing systems is the inability of the slit to be completely sealed. As a result, leaks occur, resulting in heat loss.

Prior art tape systems, whether separately applied or integrally formed with the tube, are incapable of being securely affixed to the surface of the foam tube, due to the physical construction of the tube's surface. Consequently, these prior art tape sealing systems tend to peel off of the tube, causing the tube to open. In addition, these tape systems are extremely expensive, add additional labor costs, and cannot be recycled.

The use of cement or glue is also extremely unpopular due to its inherent, labor-intensive, time-consuming and messy nature. Furthermore, the glue or cement material and application must be separately purchased and brought to each site for use. As a result, this system has not been accepted by the industry.

In an attempt to satisfy the demand for a locking or sealing system which does not require adhesive strips, cement, or glue, various external locking clamps, clips, or fastening devices have been constructed. However, all of these prior art systems have proven to be unpopular, due to the requirement that the installer must carry extra material, namely the external fastener, and the installation of these external fasteners is tedious, time consuming and expensive. Furthermore, these fasteners tend to fall off, thereby allowing the slit to open. As a result, these prior art systems have not become successful.

Other systems incorporate an elongated tongue-and-groove closure system, with the tongue-and-groove longitudinally extending along the entire length of the tube, formed in the opposed side walls of the slit. However, although this construction eliminates the need for external fasteners, tape, or cement, this system has proven to be unsuitable in solving industry's problems. Typically, substantial heat loss does occur and unwanted opening of the slit often occurs. In addition to such installation and use problems, stiffening material is required, which adds extra expense and labor to the production of these tubes.

Therefore, it is a principal object of the present invention to provide a closure system for elongated, thermoplastic or elastomeric tubes which is integrally affixed to the tube and is quickly and easily employed, without requiring the use of any external material, providing rapid installation about any elongated pipe.

Another object of the present invention is to provide a closure system for elongated, thermoplastic or elastomeric tubes, having the characteristic features described above which provides a high degree of insulation for preventing or reducing heat loss from fluid carrying pipes and which is convenient to employ and provides a dependable, secure locking arrangement that is achieved with simplicity and ease, assuring time-efficient installation thereof.

A further object of the present invention is to provide a closure system for elongated, thermoplastic or elastomeric tubes, having the characteristic features described above, which is inexpensive to manufacture and provides a secure, dependable, trouble-free bonded interengagement with the tube, virtually eliminating unwanted peeling or dislodgement.

Another object of the present invention is to provide a closure system for elongated, thermoplastic or elastomeric tubes, having the characteristic features described above, which completely eliminates the need for any stiffening material, internally or externally, formed therewith.

Another object of the present invention is to provide a closure system for elongated, thermoplastic or elastomeric tubes, having the characteristic features described above, which allows the tubes to be quickly and easily installed inexpensively and rapidly.

Other and more specific objects will in part be obvious and will in part appear hereinafter.

SUMMARY OF THE INVENTION

By employing the present invention, all of the difficulties and drawbacks encountered in prior art closure systems have been eliminated and a highly effective, easily employed, closure system for securely sealing the elongated slit of elongated, thermoplastic or elastomeric tubes is realized. In the present invention, these prior art drawbacks and difficulties are eliminated by employing a multi-layered, self-sealing, adhesive system which is laminated directly to the thermoplastic or elastomeric elongated tube.

In order to impart the desired insulation to the pipe or conduit about which the elongated tube is mounted, the tube is formed of substantially thick material. In this way, coverage and insulation of the fluid carrying pipe is realized and unwanted temperature loss and energy loss is prevented. Typically, the elongated tube is formed from a foamed, cellular thermoplastic or elastomeric material. One such material often employed is foamed closed cell polyethylene. This material is preferred since this cellular foamed thermoplastic material provides a high degree of insulation for its size and weight. However, other materials with substantially equivalent characteristics may be employed without departing from the scope of this invention.

By providing a sealing system which is laminated directly to the outer surface of the polyethylene, thermoplastic, or elastomeric foam tube, the sealing system is effectively integrally bonded to the outer surface of the elongated tube. In this way, virtually 100% adhesive interengagement is attained, and a sealing system is achieved which is incapable of being unwantedly removed from the tube. By employing the present invention, removal of the adhesive system is attained only by physically destroying the integrity of the elongated polyethylene, thermoplastic, or elastomeric foamed tube itself.

As discussed above, prior art closure systems have been developed which employ an adhesive backed carrier tape or film which is affixed to the foam tube by contacting the adhesive layer with the foam tube. These prior art closure systems have been employed on the outside surface of the elongated foam tube spanning the elongated slit, as well as along the side edges forming the elongated slit. However, regardless of which area of the foam tube is used, these prior art systems are incapable of providing secure, peel-resistant bonded interengagement with the foam tube.

As is well known in the art, thermoplastic and elastomeric foam tubes comprise extremely irregular, non-smooth surfaces which incorporate numerous depressions or craters randomly dispersed throughout the surface. This construction results in randomly located upstanding ridges or sections forming the outer peripheral surface thereof.

In view of this well-known construction, the use of adhesive backed tapes or films as the means for sealing the elongated slit have proven to be ineffective, since the contact between the adhesive layer and the surface of the film is made only along the upstanding ridges or sections which form the outer surface of the foam tube. Consequently, only random point contact is realized, resulting in insufficient bonding strength to assure a consistent, long-term, uniform, securely affixed adhesion of the tape or film to the surface of the foam tube. As a result, these prior art systems generally fail to provide the desired secure sealing, and typically result in loosening or dislodgement of the tape from the tube and unwanted opening of the elongated slit.

In the present invention, all of these prior art difficulties and drawbacks have been eliminated by achieving a unique, multi-layered closure system and applying the uniquely constructed, multi-layered closure system to the elongated thermoplastic or elastomeric tube in a novel and unobvious construction. In accordance with the present invention, both the resulting product and its method of application constitute the unique features of this invention.

As detailed above, typical prior art systems incorporate a supporting base or carrier layer on which adhesive material is coated. Then, using this adhesive coated carrier in one of a variety of alternate constructions, the prior art systems merely apply the adhesive coated carrier to the thermoplastic or elastomeric tube member. In some instances, an additional coated strip is applied along half of the carrier layer to form a release strip which allows a portion of the adhesive backed carrier layer to be applied along one side of the slit, while the other side of the slit is secured to the adhesive backed carrier layer after mounting of the elongated tube about the desired conduit and removal of the release strip. However, regardless of which construction is employed, these prior art attempts have been completely incapable of satisfying user needs.

In the present invention, the multi-layered bonded closure system comprises an adhesive backed carrier layer along with the unique incorporation of a second carrier layer. In addition, one side of the second carrier layer is mounted to the adhesive layer, with the opposed side thereof being bonded to a thin strip of polyethylene or other heat laminating film. When the preconstructed multi-layered closure system is applied to the thermoplastic or elastomeric foam tube member, the polyethylene or heat laminating film is heated to its laminating temperature and laminated directly to the outer surface of the thermoplastic or elastomeric foam tube. In this way, the multi-layered closure system is securely bonded to the outer surface of the foam tube, and secure, integral, bonded interengagement of the closure system to the foam tube is attained.

The width of the multi-layered closure system is constructed to provide secure, bonded interengagement thereof with the foam tube. Typically, a width ranging between about 1 and 3 inches is sufficient for most applications. In addition, in the preferred embodiment, one-half the width of the multi-layered bonded closure system also incorporates an elongated strip of release paper interspersed between the first and second carrier layers, in overlying protective engagement with the adhesive layer.

In this way, one-half of the multi-layered bonded closure system forms a sealing flap which can be activated by the user upon removal of the release paper and contacting the adhesive layer with the second carrier layer. Since the opposed surface of the second carrier layer is bonded to the thermoplastic or elastomeric foam tube, the adhesive interengagement of the first carrier layer with the second carrier layer provides the desired sealed closure of the elongated tube in the desired position. With the free, release strip bearing sealing flap being positioned in overlying cooperating engagement with the slit of the foam member, the user is able to easily and effectively close the slit of the foam member, when desired, establishing a secure, permanently sealed closure thereof.

The invention accordingly comprises the several steps and relation of one or more such steps with respect to each of the others, and the article possessing the features, property, and relation of elements which are exemplified in the following detailed disclosure, and the scope of the invention will be indicated in the claims.

THE DRAWINGS

For a fuller understanding of the nature and objects of the invention, reference should be had to the following detailed description taken in connection with the accompanying drawings in which:

FIG. 3 is a diagrammatic side elevation view depicting the process employed in the present invention for securely bonding the multi-layered closure system to the elongated foam member and for forming the central slit therein; and FIGS. 4–7 are cross-sectional elevation views taken along respective lines of FIG. 3.

DETAILED DISCLOSURE

Figure 1:
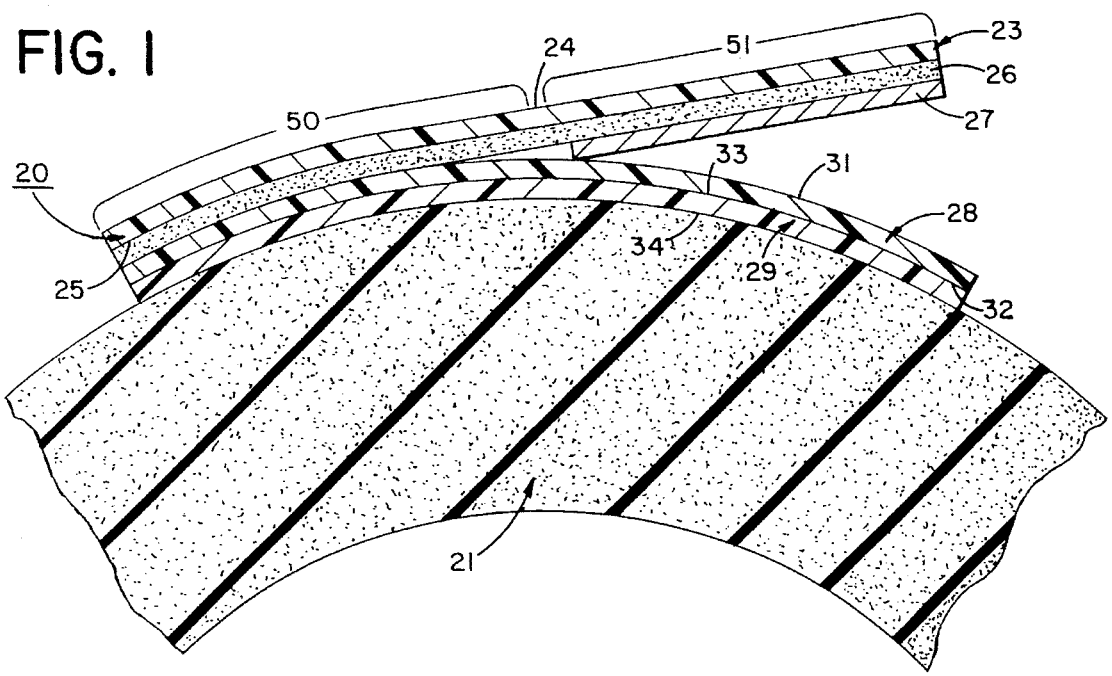
FIG. 1 is a cross-sectional side elevation view, partially broken away, depicting the composite, multi-layered, bonded closure system of the present invention integrally laminated to the outer surface of a typical thermoplastic or elastomeric foam member.
Figure 2:
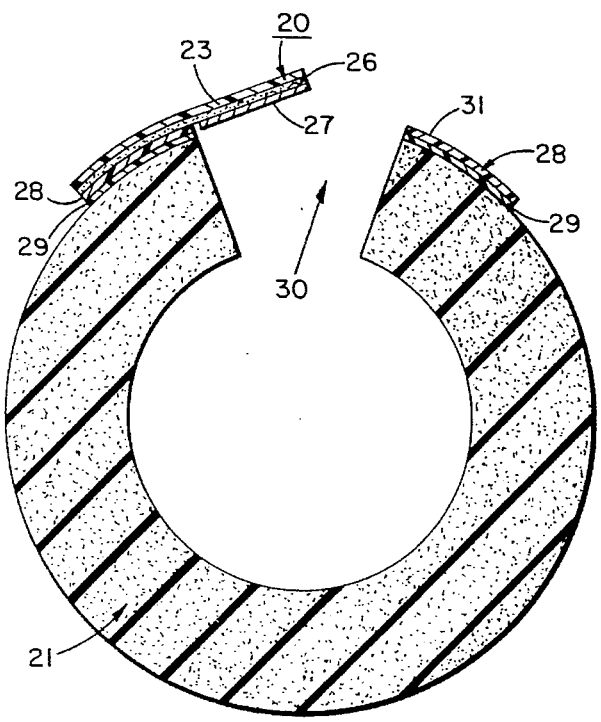
FIG. 2 is a cross-sectional side elevation view, similar to FIG. 1, depicting the thermoplastic or elastomeric foam member after forming of a central elongated slit therein.

In FIGS. 1 and 2, multi-layered, closure system 20 of the present invention is depicted integrally bonded to thermoplastic or elastomeric foam tube or member 21. Throughout the drawings, foam tube 21 is depicted as an elongated, hollow polyethylene or thermoplastic foam tube which incorporates longitudinally extending slit 30 formed therein extending from the outer peripheral surface thereof to the central hollow zone.

As discussed above, elongated tube 21 is formed of substantially thick material, to provide insulating and water protecting coverage of the fluid carrying pipe with sufficient material to prevent unwanted temperature loss, energy loss, and damage. Typically, tube 21 is formed from a foamed, cellular thermoplastic material, such as a closed cell polyethylene. This material is preferred since the cellular foamed thermoplastic material provides a high degree of insulation for its size and weight. In addition, elastomeric materials or combined elastomeric/thermoplastic materials are employed with equal efficacy.

Furthermore, foam tube member 21 is depicted as the product on which multi-layered closure system 20 of the present invention is employed. Although a foam tube of this construction is the principal product upon which the multi-layered bonded closure system of the present invention is applicable, other uses for the multi-layered bonded closure system can be made without departing from the scope of this invention, and other material can be employed with equal efficacy. Consequently, it should be understood that all other applications and all other tube materials are intended to be encompassed within the scope of this invention.

In the preferred embodiment, multi-layered closure system 20 comprises a first carrier layer 23, which incorporates a first surface 24 and a second surface 25. As depicted, first surface 24 forms the exposed top surface of multi-layered closure system 20, while second surface 25 is coated with adhesive layer 26. Preferably, adhesive layer 26 covers surface 25 substantially in its entirety and comprises any desired conventional pressure sensitive adhesive typically employed in products of this nature.

In the preferred embodiment, as depicted in FIGS. 1 and 2, a coated release strip or liner 27 is placed in intimate, contacting engagement with adhesive layer 26, covering about one-half of the width of adhesive layer 26. As is more fully detailed below, this construction protects the covered portion of adhesive layer 26 from unwanted sealing to tube 21, until elongated tube 21 has been positioned in the desired location and is ready for sealing securement in its mounted position.

In accordance with the present invention, multi-layered closure system 20 also incorporates a second carrier layer 28 and a laminating film layer 29. Second carrier layer 28 comprises surfaces 31 and 32, while laminating film layer 29 comprises surfaces 33 and 34.

In the preferred embodiment, surface 32 of second carrier layer 28 is securely affixed in juxtaposed, overlying, contacting engagement with surface 33 of laminating film layer 29. In addition, about one-half of the width of surface 31 of second carrier layer 28 is securely affixed to the portion of adhesive layer 26 which is exposed and is not in contact with release strip 27. The remainder of surface 31 is in juxtaposed, spaced, facing relationship with release liner 27.

As is fully detailed below, surface 34 of laminating film layer 29 is securely affixed in intimate, contacting bonded engagement with foam tube 21, during the bonding application process of this invention. In this application process, multi-layered closure system 20 of the present invention is intimately bonded onto the outer surface of foam tube 21 in order to be integrally interengaged therewith.

During this bonding application process, heat laminating film layer 29 is heated to its laminating temperature or melting point and then intimately bonded or laminated directly to the outer surface of thermoplastic or elastomeric foam member 21. As a result, multi-layered closure system 20 is affixed in secure, bonded interengagement with the outer surface of foam member 21.

Once this bonded interengagement has been completed, second carrier layer 28 is incapable of being manually removed or peeled away from foam member 21, without destroying the surface of foam member 21 to which it is intimately affixed. As a result, multi-layered closure system 20 is intimately affixed to foam member 21 in a manner which prevents unwanted removal of closure system 20 from tube 21. Consequently, the drawbacks and difficulties encountered with prior art products are completely eliminated.

By employing multi-layered bonded closure system 20 of the present invention, it has been found that virtually 100% contact of closure system 20 to foam member 21 is realized. This high strength, non-peelable, intimate bonded interengagement is attained due to the fact that laminating film layer 29 is physically melted during the laminating process, thereby flowing into the pores and crevices existing in the outer surface of foam tube 21.

In addition, during the affixation process, multi-layered closure system 20 and the outer surface of foam tube 21 are heated simultaneously and intimately affixed to each other by compression rollers. As a result, the upstanding ridges or sections otherwise existing in the outer surface of foam tube 21 are compressed and a substantially flatter surface area is attained.

In addition to flattening the outer surface of foam tube 21, the laminating of layer 29 to foam tube 21 causes multi-layered closure system 20 to become an integral part of foam tube 21, with second carrier layer 28 being intimately bonded to the outer surface of foam member 21. As a result, secure, peel-preventing bonded interengagement of multi-layered closure system 20 to foam tube 21 is attained.

It has been found that the thickness of laminating film layer 29 required to attain secure bonding interengagement of multi-layered closure system 20 to tube 21 is substantially less than the thickness required for adhesives in typical prior art constructions. In general, the thickness of laminating film layer 29 ranges between about 0.0005 and 0.005 inches. This thickness is about one-half of the thickness typically required for conventional adhesives affixed to foam tubes. Consequently, substantially less material expense is incurred with the present invention, while also obtaining a substantially enhanced, securely affixed bonded interengagement of multi-layered closure system 20 to foam tube 21.

Furthermore, any suitable heat sensitive laminating film can be employed for layer 29. Since polyethylene foamed material is preferred for tube 21, it has been found that polyethylene film provides the desired results as layer 29. However, although heat laminating polyethylene film is preferred, other laminating film can be employed with equal efficacy.

Although most laminating films can be employed in this invention, it is preferred that laminating film layer 29 comprise a melting temperature ranging between about 80° C. and 120° C. In this way, closure system 20 is able to be securely bonded to tube 21 using conventional heating equipment.

In the preferred embodiment, multi-layered closure system 20 is integrally bonded to foam tube 21 prior to forming longitudinally extending slit 30 in foam tube 21 as depicted in FIG. 1. Once completed, slit 30 is formed in tube 21 to attain the structure detailed in FIG. 2.

This preferred method is fully detailed below. If desired, however, multi-layered closure system 20 of the present invention can be applied to foam tube 21 after elongated slit 30 has been formed therein. As a result, this alternate method may be employed without departing from the scope of this invention.

Whenever the intimate bonding of multi-layered closure system 20 to a pre-slit foam tube 21 is desired, one application process is to affix multi-layered closure system 20 to foam tube 21, spanning elongated slit 30. Once multi-layered closure system 20 is securely bonded to the outer surface of foam tube 21 in the desired manner, second carrier layer 28 and laminating layer 29 are slit in order to enable slit 30 of foam tube 21 to be opened by the user when desired.

In an alternate application process, multi-layered closure system 20 is applied in two steps, so as to attain the construction depicted in FIG. 2. Although this method would require additional processing steps, a method of this nature may be employed, without departing from the scope of this invention, in order to attain the secure, intimately bonded closure system of the present invention.

In constructing the multi-layer bonding closure system of the present invention, any desired materials having the capability of functioning in the manner detailed above can be employed. It has been found, however, that first carrier layer 23 and second carrier layer 28 are both preferably formed from mylar.

Due to the strength and flexibility of mylar, the use of this material is preferred. Furthermore, with mylar comprising top surface 24 of closure system 20, it is easy for users to write desired information directly on the mylar tape. This benefit has long been sought by users, but was not attainable with prior art systems.

It has also been found that the thickness of the mylar can be varied between about 0.0005 and 0.005 inches, depending upon the particular uses to which multi-layered closure system 20 is to satisfy.

By referring to FIGS. 3–7, along with the following detailed disclosure, the preferred method for intimately bonding multi-layered closure system 20 to foam tube 21 can best be understood. In the preferred embodiment, multi-layered closure system 20 is constructed in a continuous elongated form which is wound about a support member to form a continuously dispensing roll 35 of multi-layered closure system 20.

As shown in FIG. 3, roll 35 is mounted in juxtaposed, spaced, cooperating relationship with elongated foam tube 21, ready for secure bonded application thereto. In the preferred embodiment, continuous, multi-layered closure system 20 extends from roll 35 about position controlling roller 36 to pressure rollers 37, 38, and 39. In addition, elongated foam tube 21 is supported for being continuously advanced relative to rollers 36, 37, 38, and 39, a portion of the outer surface of tube 21 being maintained in continuous engagement with compression rollers 37, 38, and 39.

Furthermore, heating element 40 is positioned directly adjacent roller 37 in juxtaposed, spaced, cooperating relationship with foam tube 21 and multi-layered closure system 20, as system 20 extends between roller 36 and roller 37. Although any suitable heating source can be employed for heating element 40, it is preferred that a hot air blower is employed and positioned in direct, juxtaposed, spaced, cooperating relationship with multi-layered closure system 20, directly prior to the advancement of multi-layered closure system 20 onto foam tube 21.

By employing the construction detailed above, heat laminating film layer 29 of multi-layered closure system 20 is exposed to the hot air from heating element 40, raising the temperature of laminating film layer 29 to its melting point just prior to the advancement of multi-layered closure system 20 onto the outer surface of foam tube 21. In addition, pressure roller 37 assures that multi-layered closure system 20 is forced in compression onto the surface of elongated foam tube 21, providing intimate, secure, bonded interengagement of laminating film layer 29 with foam tube 21.

In order to further enhance and assure the secure, bonded, interconnected engagement of multi-layered closure system 20 with foam tube 21, compression rollers 38 and 39 are also employed to continuously maintain multi-layered closure system 20 in forced, compressed, contacting interengagement with the surface of tube 21. In this way, the desired bonded application of multi-layered closure system 20 with foam tube 21 is assured.

In addition to heating laminating film layer 29 of multi-layered closure system 20 to its melting point for providing the bonded interengagement of multi-layered closure system 20 with foam tube 21, heating element 40 also raises the temperature of foam tube 21 along the outer surface thereof to which multi-layered closure system 20 is being affixed. As a result, the temperature of both multi-layered closure system 20 and foam tube 21 are elevated to assure secure, intimate bonded interengagement with each other.

As mentioned above, although any desired laminating film can be employed, it is preferred that laminating film layer 29 comprises a melting point that ranges between 80° C. and 120° C. In this way, the desired secure bonded affixation of closure system 20 to tube 21 is attained effectively and efficiently with conventionally available equipment.

As is apparent from FIG. 3 and the foregoing detailed disclosure, the use of the preferred manufacturing process assures continuous trouble-free affixation of multi-layered closure system 20 to foam tube 21 both efficiently and cost effectively. Furthermore, multi-layered closure system 20 is securely bonded to the outer surface of foam tube 21 in a continuous, direct application process which is attained with a minimum of components and labor. As a result, an extremely efficient, cost-effective affixation method is realized.

In the preferred embodiment, elongated slit 30 is formed in tube 21 immediately after multi-layered closure system 20 is affixed to foam tube 21. In this preferred method, as depicted in FIGS. 3–7, multi-layered closure system 20 advances from the final compression roller 39 to camming flange 45 and cutting blade 46.

Camming flange 45 is constructed to allow multi-layered closure system 20 to slidingly engage camming flange 45, with flange 45 positioned between coated release strip 27 and surface 31 of second carrier layer 28. In addition, camming flange 45 controllably flexes the portion of multi-layered closure system 20 to which release strip 27 is affixed to a position spaced away from surface 31 of carrier layer 28, thereby enabling slit 30 to be formed in foam tube 21 and through second carrier layer 28 and laminating film layer 29.

When multi-layered closure system 20 advances away from compression roller 39 towards camming flange 45, second carrier layer 28 is securely, intimately bonded to foam tube 21. In addition, one-half of first carrier layer 23 is securely affixed to surface 31 of second carrier layer 28 by adhesive layer 26, forming portion 50 of multi-layered closure system 20. The remaining half of first carrier layer 23, with coated release strip 27, forms portion 51 which is flexibly movable relative to the portion of surface 31 above which release strip 27 is in facing relationship.

As depicted in FIGS. 4–7, camming flange 45 is constructed to arcuately flex portion 51 away from its normal position in juxtaposed, spaced, relationship with surface 31 of second carrier layer 28. Once fully flexed into this alternate position the portion of surface 31 of second carrier layer 28 which was in facing relationship with strip 27 is completely exposed. Once in this position, the top surface of second carrier layer 28 and foam tube 21 are cut to form elongated, longitudinally extending slit 30 therein. This elongated slit is formed by cutting blade 46, which is mounted directly adjacent camming flange 45 at the precise position where portion 51 is arcuately flexed to the maximum amount.

When multi-layered closure system 20 has cleared cutting blade 46, camming flange 45 terminates, allowing portion 51 to flex back to its original position in juxtaposed, spaced, cooperating relationship with second carrier layer 28. However, with elongated slit 30 formed in foam tube 21, second carrier layer 28 and laminating film layer 29, multi-layered closure system 20 of the present invention is complete, ready for final packaging and use as desired.

By employing the process detailed above, a pre-slit foam tube 21 is attained which incorporates multi-layered closure system 20 bonded to the outer surface thereof. As depicted in FIG. 2, multi-layered closure system 20 comprises first carrier layer 23, adhesive layer 26, and release strip 27 intimately affixed to one-half of second carrier layer 28 and laminating film layer 29, with carrier layer 28 and laminating film layer 29 intimately bonded to tube 21 along one side of slit 30. The second half of second carrier layer 28 and laminating film layer 29 is intimately bonded to tube 21 adjacent the other side of slit 30. As a result, release strip 27 is positioned in juxtaposed spaced relationship to the exposed surface 31 of second carrier layer 28, ready for affixed interengagement therewith whenever tube 21 is installed and release strip 27 is removed. With this construction, installation of foam tube 21 in any desired location is quickly and easily achieved, with closure system 20 providing the desired secure affixed mounted interengagement of foam tube 21.

It will thus be seen that the objects set forth above, among those made apparent from the preceding description are efficiently attained and, since certain changes may be made in carrying out the above method and in the articles set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A process for securely, integrally bonding a multi-layered closure system to an elongated, pre-formed, foamed thermoplastic or elastomeric tube member comprising the steps of A. forming an elongated, substantially continuous tube member from foamed thermoplastic or elastomeric material, said tube member having an axial bore extending therethrough and a sufficient thickness for being self supporting;

B. forming an elongated, continuous length of a multi-layered closure system comprising
     a. a laminating film layer, and
     b. a film support layer integrally affixed to said laminating film layer in secure, aligned, affixed interrelationship therewith;

C. longitudinally advancing the elongated, pre-formed, self-supporting, foamed tube member with a portion of the outer surface thereof advancing in contact with a plurality of compression rollers;

D. feeding the elongated, multi-layered closure system between the compression rollers and the outer surface of the elongated tube; and E. heating the laminating film layer of said multi-layered closure system to its melting temperature prior to contacting the laminating film layer with the outer surface of the elongated tube, whereby the multi-layered closure system is integrally bonded to the outer surface of the elongated tube in a continuous, efficient, and expeditious manner.

2. The process defined in claim 1, wherein the multi-layered closure system is further defined as comprising a single continuous elongated strip which is wound upon a roll and positioned for being continuously dispensed for application to the elongated tube.

3. A process for securely, integrally bonding a multi-layered closure system to an elongated, hollow, thermoplastic or elastomeric tube member comprising the steps of A. forming an elongated, substantially continuous tube member from foamed thermoplastic or elastomeric material, said tube member having an axial bore extending therethrough and a sufficient thickness for being self supporting;

B. forming an elongated, continuous length of a multi-layered closure system comprising
   a. a laminating film layer,
   b. a film support layer integrally affixed to said laminating film layer in secure, aligned, affixed interrelationship therewith;
   c. an elongated, adhesive support layer comprising an overall width substantially equivalent to the width of the film support layer,
   d. an adhesive layer substantially entirely covering one surface of said adhesive support layer,
   e. an easily removed, elongated release strip
      1. comprising a width ranging between about 40% and 60% of the width of the adhesive support layer,
      2. affixed to the adhesive layer with one edge thereof in juxtaposed, aligned relationship with a first edge of the adhesive support layer, and
      3. extending substantially the entire length of said adhesive support layer in overlying, covering, interengagement with a first portion of said adhesive layer as formed on said adhesive support layer, thereby creating a second, exposed adhesive portion, and
   f. said second exposed adhesive portion being securely affixed to the surface of said film support layer
      1. placing the elongated release strip in juxtaposed, spaced, overlying relationship with the remaining portion of said film support layer, and
      2. forming a flexible portion consisting of the release strip, the covered portion of the adhesive layer, and the portion of the adhesive support layer associated therewith;

C. longitudinally advancing the elongated, pre-formed, self-supporting, foamed tube member with a portion of the outer surface thereof advancing in contact with a plurality of compression rollers;

D. feeding the elongated, multi-layered closure system between the compression rollers and the outer surface of the elongated tube; and E. heating the laminating film layer of said multi-layered closure system to its melting temperature prior to contacting the laminating film layer with the outer surface of the elongated tube, whereby the multi-layered closure system is integrally bonded to the outer surface of the elongated tube in a continuous, efficient, and expeditious manner.

4. The process defined in claim 3, comprising the additional steps of

F. controllably moving the flexible portion to a position whereby said flexible portion is arcuately pivoted away from overlying spaced relationship with the film support layer, G. cutting a radial, elongated slit in a portion of the elongated tube, the film support layer and the laminating film layer, substantially midway along the width of the film support layer and the laminated film layer, and H. returning the flexible portion to its original position in juxtaposed, spaced, overlying relationship with a portion of the film support layer, whereby an elongated, hollow tube member incorporating the multi-layered closure system is attained ready for installation and use.

* * * * *